United States Patent [19]

Mizuno

[11] Patent Number: 5,731,578
[45] Date of Patent: Mar. 24, 1998

[54] SOLID-STATE IMAGING APPARATUS

[75] Inventor: Seiichiro Mizuno, Hamamatsu, Japan

[73] Assignee: Hamamatsu Photonics K.K., Hamamatsu, Japan

[21] Appl. No.: 758,634

[22] Filed: Nov. 27, 1996

[51] Int. Cl.$^6$ ............................................... H01J 40/14
[52] U.S. Cl. ............................ 250/208.1; 250/214 R; 348/308
[58] Field of Search ................. 250/208.1, 214 LA, 250/214.1, 214 R; 348/281–283, 294, 295, 302, 304, 308–309, 311–312; 365/221, 222

[56] References Cited

U.S. PATENT DOCUMENTS 4,472,638   9/1984   Nishizawa et al. ............... 250/208.1
5,322,994   6/1994   Uno ................................. 250/208.1

FOREIGN PATENT DOCUMENTS 4-3588   1/1992   Japan .

*Primary Examiner*—Que Le
*Attorney, Agent, or Firm*—Cushman Darby & Cushman IP Group of Pillsbury Madison & Sutro LLP

[57] ABSTRACT

During the collection operation for the imaging data of the optical image supplied to the light receiving unit in which the vertical light receiving sections are horizontally arranged, each vertical light receiving section having the light receiving devices arranged vertically therein, among the integration circuit, the buffer circuit, and horizontal reading-out section, which are arranged in each horizontal signal processing section, the integration circuit and the buffer circuit are rendered at non-operation state during the horizontal reading-out operation controlled by the timing control section, so that power is not consumed substantially during the horizontal reading-out operation. As a result, the image picking-up of the optical image supplied to the light receiving unit can be executed with a high S/N ratio and low power consumption, thereby providing a solid-state imaging apparatus which is capable of picking-up the image with a high S/N ratio and achieving a reduction in power consumption.

2 Claims, 3 Drawing Sheets

SOLID-STATE IMAGING APPARATUS

BACKGROUND OF THE INVENTION

1. Field of the Invention

The present invention relates to a solid-state imaging device for imaging a two-dimensional optical image input thereto.

2. Related Background Art

The imaging device employing a solid imaging element which is represented by a charge coupled device (hereinafter referred to as a CCD) has been used in various kinds of fields including household videos. However, since the CCD has a low charge transfer efficiency, when charges stored in photo diodes having comparatively a large light receiving area are handled to be transferred, the charges are not transferred completely. For such reason, in the specified field, of the solid-state imaging apparatuses, MOS type image sensors have been preferably employed which produce no problem on the charge transfer efficiency.

Among the MOS type image sensors, the ones for picking-up two-dimensional optical images have heretofore adopted a system wherein single discrete amplifier is provided for a photo diode array having a plurality of two-dimensionally arranged photo diodes, a light detection signal is fetched from each photo diode after it is amplified by the amplifier. Recent years, the proposals to mount both of a reading-out circuit and a light detection circuit on the same chip and to modify a system of circuit structure have been made in order that an S/N ratio for the light detection signal is increased and the apparatus is miniaturized, while utilizing the merits of the MOS image sensors.

Such a conventional solid state imaging device disclosed in Japanese Patent Application Laid Open Heisei 4-3588. FIG. 1 is a circuit diagram of this solid-state imaging apparatus. As shown in FIG. 1, the apparatus comprises (a) a light receiving section 930 consisting of an N2 number of vertical light receiving sections 920 arranged in a horizontal direction, each being connected by common output lines and each being provided with an N1 number of light receiving devices 910 arranged in a vertical direction, each of which is composed of a photoelectric conversion element 911 and a switching element 912; (b) integration circuits 940, each being arranged for corresponding one of the vertical light receiving sections 920 to integrate the output therefrom and having a charge amplifier 941; (c) sample-and-hold circuits 950, each sampling-and-holding the signal from corresponding one of the integration circuits 940; (d) switching circuit 960, each controlling the output/non-output of the signal from corresponding one of the sample-and-hold circuits 950 to the outside; (e) a vertical shift register 971 for instructing to determine the light receiving device 910 to read out the light detection result for the vertical direction; and (f) a horizontal shift register 972 for instructing to determine the light receiving device 910 to read out the light detection result for the horizontal direction.

The conventional solid-state imaging apparatus proposed has a structure as described above and therefore, an absolute quantity of power consumption of the apparatus may increase significantly.

SUMMARY OF THE INVENTION

In view of the foregoing problems, the object of the present invention is to provide a solid-state imaging apparatus which is capable of reducing the power consumption thereof.

A solid-state imaging apparatus of the present invention which images a two-dimensional optical image comprises:

(a) a light receiving unit composed of a first number of vertical light receiving sections arranged along a first direction, each of which consists of a second number of light receiving devices arranged in a second direction, each light receiving device is composed of a photoelectric conversion element for converting an input optical signal to a current signal and a switching element which has a first terminal connected to a signal output terminal of said photoelectric conversion element and a second terminal to provide a current signal generated by said photoelectric conversion element in response to a vertical scanning signal, each of said vertical light receiving sections having a signal output terminal electrically connected to the second terminal of said switching element;

(b) a first number of integration circuits for receiving individually the output signal from the corresponding vertical light receiving section, each of which enables, in response to a reset instruction signal, a first capacitance element either to perform an integration for the current signal output from corresponding one of said vertical light receiving section or not to perform the integration for the current signal while said integration circuit is in operation in response to a first operation instruction signal, the first capacitance element being connected between input and output terminals of a charge amplifier and said integration circuit consuming no power substantially while said integration circuit is not in operation in response to the first operation instruction signal;

(c) the first number of second capacitance elements, each receiving a first integration signal output from corresponding one of said integration circuits and outputting the first instruction signal after reducing an offset value for corresponding one of the integration circuits;

(d) the first number of clamping elements, each receiving a second integration signal via corresponding one of said second capacitance elements, and shortcircuitting a signal output terminal of corresponding one of said second capacitance elements to a group terminal in response to a clamping instruction signal;

(e) the first number of first buffer circuits, each receiving said second integration signal from corresponding one of said second capacitance elements, and each outputting corresponding one of said second integration signals after performing an impedance conversion for corresponding one of said second integration signals during operating state in response to a second operation instruction signal and consuming no power substantially during non-operating state in response to the second operation instruction signal;

(f) the first number of sample-and-hold circuits, each receiving a signal from corresponding one of said first buffer circuits, and performing either a sampling operation or a holding operation in response to a sampling signal;

(g) the first number of horizontal reading-out section, each of which has a second buffer circuit and outputs an impedance conversion signal in response to a horizontal scanning signal, each second buffer circuit receiving a signal output from corresponding one of said sample-and-hold circuits and performing an impedance conversion for the signal; and (h) a timing control section for issuing said vertical scanning signal, said clamping instruction signal, said reset instruction signal, said sampling instruction signal, and said horizontal scanning signal, said timing control section rendering the first and second operation instruction signals to be truth (hereinafter referred to as logical one) at a state that any vertical light receiving section is not selected thereby reading out no signal from any vertical light receiving section prior to a start of a vertical scanning by said horizontal scanning signal, and rendering said first and second operation instruction signals to be false (hereinafter referred to as logic zero) during the vertical scanning by the horizontal scanning signal.

Here, the timings when the first and second operation instruction signals are rendered to be logical one may be approximately the same.

In the solid-state imaging apparatus of the present invention, the vertical scanning signal is output, which serves to render only the switching element to be ON state, the switching element being arranged in the light receiving device, first selected in a vertical scanning, of each vertical light receiving section. Upon rendering of this switching element to ON state, the charges are output to the integration circuit from the light receiving device as the current signal, which have been stored in the photoelectric conversion element by light receiving until turning ON of the switching element. Then, the charges are stored instantaneously in a feedback capacitance by the integration circuit to be output as a voltage. Subsequently, an offset is reduced by the second capacitance element. An impedance conversion is performed by the first buffer circuit. Thereafter, the charges in accordance with the charge quantity stored in the photoelectric conversion element are stored in the sample-and-hold circuit. The vertical scanning signal is set, immediately after completion of the sampling operation, such that the vertical scanning signal does not select any light receiving device.

Subsequently, the first and second operation instruction signals are set to logical zero. As a result, the integration circuit and the first buffer circuit are shifted to non-operation state, so that power consumption of the integration circuit and the first buffer circuit will be approximately zero. Although the integration circuit and the first buffer circuit are shifted to the non-operation state, the sample-and-hold circuit has already been in a hold state. Therefore, the output from the sample-and-hold circuit is not varied so that the output from the second buffer circuit is not also varied.

Subsequently, the horizontal scanning signal is set such that the output from each second buffer circuit is sequentially alternatively selected, whereby the detection signal in accordance with the charges stored in the light receiving device of each vertical light receiving section is sequentially read out, which is first selected in the vertical scanning.

It is noted that the reset instruction signal and the clamping signal are set to be logical one until the horizontal scanning for the light receiving device, first selected in the vertical scanning, of each vertical light receiving section is completed after completion of the sampling operation.

When the sequential reading-out of the detection signal for the light receiving device of each vertical light receiving section is completed, which is first selected in the vertical scanning, the horizontal scanning signal is set such that any light receiving section is not selected so as to output the signal. At this time, the vertical scanning signal is output, which renders only the switching element of each vertical light receiving section to be ON state, the switching element being secondly selected in the vertical scanning. When this switching element is rendered to be ON state, the charges which have been stored in the photoelectric conversion element by light receiving are output from the light receiving device as the current signal.

Afterward, similar to the case of the light receiving device of each light receiving section which is first selected in the vertical scanning, the detection signal is sequentially read out, which corresponds to the light receiving device, secondly selected in the vertical scanning, of each vertical light receiving section.

Subsequently, while designating sequentially the light receiving device of each vertical light receiving section, similar to the case of the light receiving device, first selected in the vertical scanning, of each vertical light receiving section, the detection signal in accordance with the charges stored in the light receiving device of each vertical light receiving section is sequentially read out. Thus, the imaging date of the optical image input to the light receiving device is collected.

The present invention will be more fully understood from the detailed description given hereinbelow and the accompanying drawings, which are given by way of illustration only and are not to be considered as limiting the present invention.

As described above, according to the solid-state imaging apparatus of the present invention, the signal processing circuit such as the integration circuit and the buffer circuit is arranged for each vertical light receiving section, and the clamping circuit for reducing the offset of each signal processing circuit is arranged. Moreover, during the horizontal reading-out operation, the active elements included in the necessary circuit portion which are arranged in the prior stage to the sample-and-hold circuit for the signal in accordance with an optical detection do not consume power. It is possible to provide a solid-state imaging apparatus with a high S/N ratio and low power consumption.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

An embodiment of a solid-state imaging apparatus of the present invention will be described with reference to the accompanying drawings.

Figure 1:
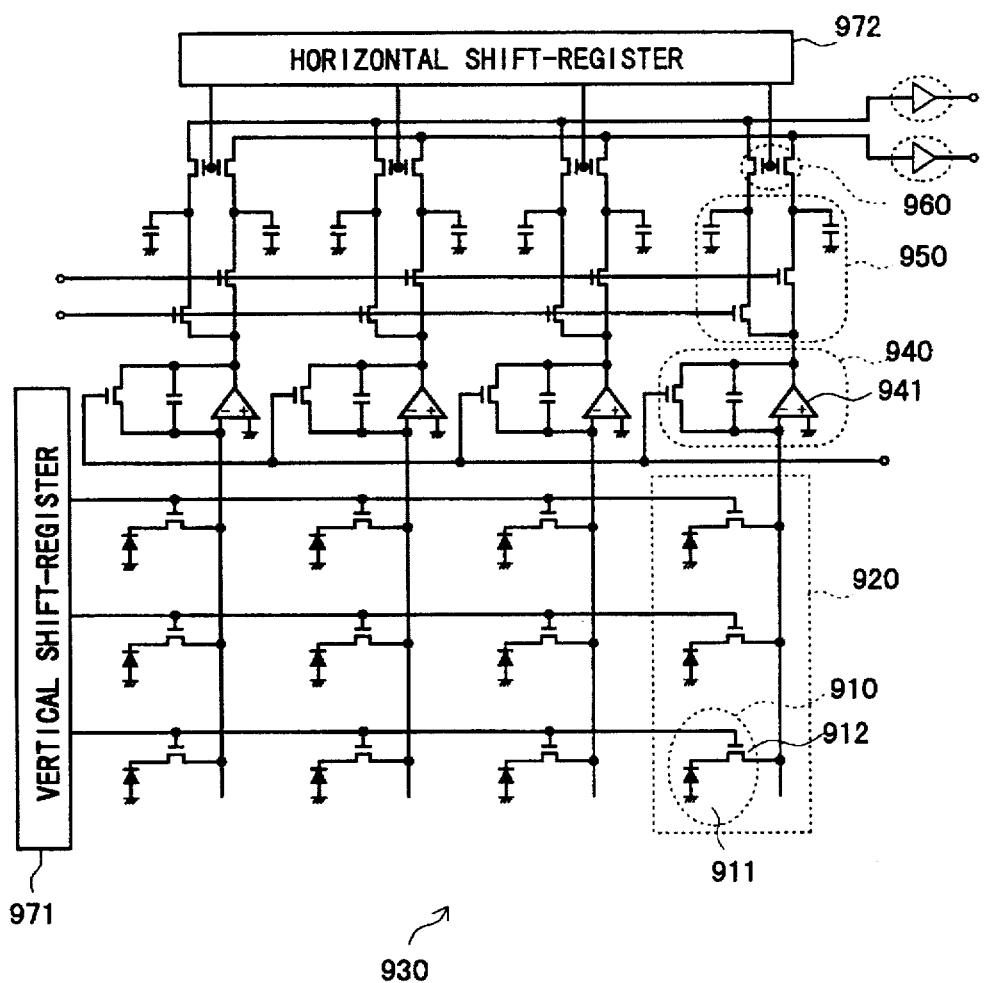
FIG. 1 is a circuit diagram of a conventional solid-state imaging apparatus.
Figure 2:
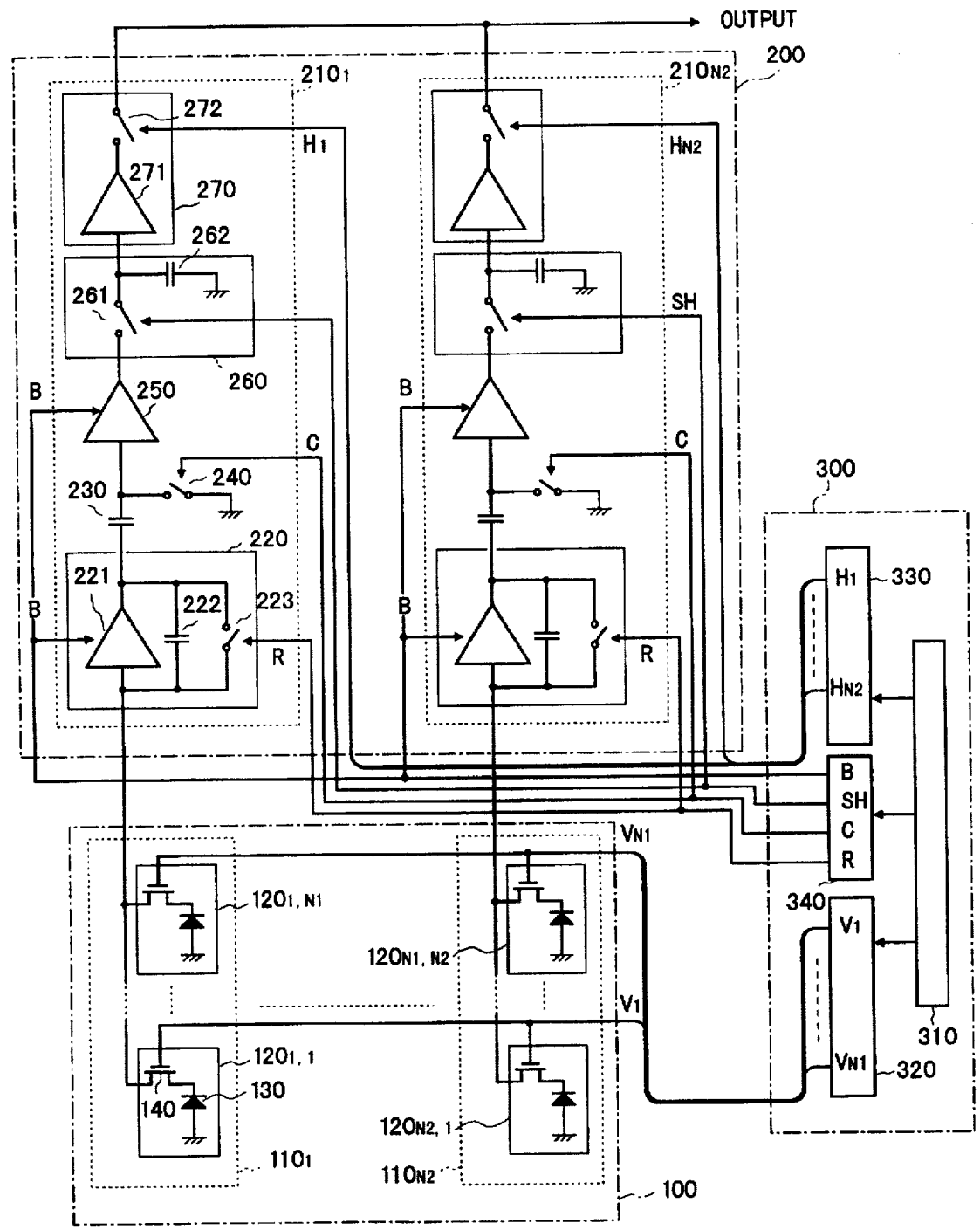
FIG. 2 is a circuit diagram of a solid-state imaging apparatus of an embodiment of the present invention.

FIG. 2 is a circuit diagram of a solid-state imaging apparatus of an embodiment of the present invention. Referring to FIG. 2, the imaging apparatus of the present invention comprises, (a) a light receiving unit 100 having an N2 number of vertical light receiving sections 110 arranged in a first direction (hereinafter referred to as a horizontal direction), each of which is composed of an N1 number of light receiving devices 120 arranged in a second direction (hereafter referred to as a vertical direction), each light receiving device 120 consisting of a photoelectric conversion element 130 for converting an input optical signal to a current signal and a switching element 140, and the switching element 140 having one terminal connected to a signal output terminal of the photoelectric conversion element 130 and the other terminal as a signal output terminal connected to an integration circuit to output the current signal generated by the photoelectric conversion element 130 in response to a vertical scanning signal Vi (Vi=1 to N1); (b) a processing unit 200 having horizontal signal processing sections $210j$, each receiving an output signal from corresponding one of the vertical light receiving sections $110_j$ (j=1 to N2) and outputting a signal alternatively in response to a horizontal scanning signal $H_j$; and (c) a timing control unit 300 for outputting an instruction signal for instructing operating timings to the light receiving device 100 and the signal processing unit 200.

The horizontal signal processing section $210_j$ includes, (1) an integration circuit 220 for receiving an output signal from the vertical light receiving section $110_j$, the integration circuit 220, during an operation state in response to an operation instruction signal B, namely, when the signal B is at logical one, performing either an integration, when the reset instruction signal R is at logical zero, or a non-integration, when the signal R is at logical one, the current signal output from the vertical light receiving section $110_j$ at a capacitance element, connected between input and output terminal of a charge amplifier 221, and the integration circuit consuming substantially no power during non-operation state in response to the signal B, namely, when the signal B is at logical zero; (2) a capacitance element 230 for receiving a signal output from the integration circuit 220 and reducing by offset value of the integration circuit 220 from the signal to output a signal; (3) a clamping switch 240 for receiving the signal from the signal from the capacitance element 230 and for shortcircuitting the signal from the capacitance element 230 to a ground level in response to a clamping instruction signal C; (4) a buffer circuit 250 for receiving the signal from the capacitance element 230, the buffer circuit 250 either performing an impedance conversion for the signal output from the capacitance element 230 to output it during the operation state in response to the signal B, namely the signal B is at logical one, or consuming substantially no power during non-operation state in response to the signal B, namely, when the signal B is at logical zero; (5) a sample-and-hold circuit 260 for receiving the signal from the buffer circuit 250 and for performing a sample-and-hold operation in response to a sampling instruction signal SH; and (6) a horizontal reading-out section 270 for receiving the signal output from the sample-and-hold circuit 260 to perform an impedance conversion for the signal and for outputting an impedance conversion signal in response to a horizontal scanning signal $H_j$.

The integration circuit 220 is composed of (i) the charge amplifier 221 for receiving the output signal from the vertical light receiving section $110_j$, the charge amplifier 221 amplifying charges of the current signal supplied thereto during the operation state in response to the operation instruction signal B, namely, when the signal B is at logical one, and the charge amplifier 221 being rendered to be non-operation state during non-operation state in response to the signal B, namely when the signal B is at logical zero, thereby substantially consuming no power; (ii) the capacitance element 222 having one terminal connected to the input terminal of the charge amplifier 221 and the other terminal connected to the output terminal thereof; and (iii) a switching element 223 having a first terminal connected to the input terminal of the charge amplifier 221 and a second terminal connected to the output terminal thereof, the switching element 223 being rendered to be ON state when the reset instruction signal R is at logical one and being rendered to be OFF state when the signal R is at logical zero.

The sample-and-hold circuit 260 is composed of (i) a switching element 261 for receiving the signal from the buffer circuit 250 at a first terminal thereof, the switching element 261 being rendered to be holding state ON when the sample-and-hold signal SH is at logical zero and being rendered to be sampling state OFF when the signal SH is at logical on; and (ii) a capacitance element 262 for storing a signal charge via the switching element 261 from the buffer circuit 250.

The horizontal reading-out section 270 is composed of (i) a buffer circuit 271 for receiving the signal from the buffer circuit 250 to perform an impedance conversion for the signal; and (ii) a switching element 272 for receiving a signal output from the buffer circuit 271 at one terminal thereof, the switching element 272 being switched from ON state to OFF state and vise versa in response to the horizontal scanning signal $H_j$.

The timing control section 300 is composed of, (i) a basic timing section 310 for generating a basic timing signal; (ii) a vertical shift register 320 for generating a vertical scanning signal Vj in response to a vertical scanning instruction informed from the basic timing section 310; (iii) a horizontal shift register 330 for generating the horizontal scanning signal $H_j$ in response to a horizontal scanning instruction informed from the basic timing section 310; and (iv) a control signal section 340 for signifying a state that horizontal scanning is not being executed and for generating the operation instruction signal b to inform an operation instruction to the buffer circuits 221 and 250, the sampling instruction signal SH, the clamping instruction signal C, and the reset instruction signal R, in response to the basic timing signal informed from the basic timing section 310.

Figure 3:
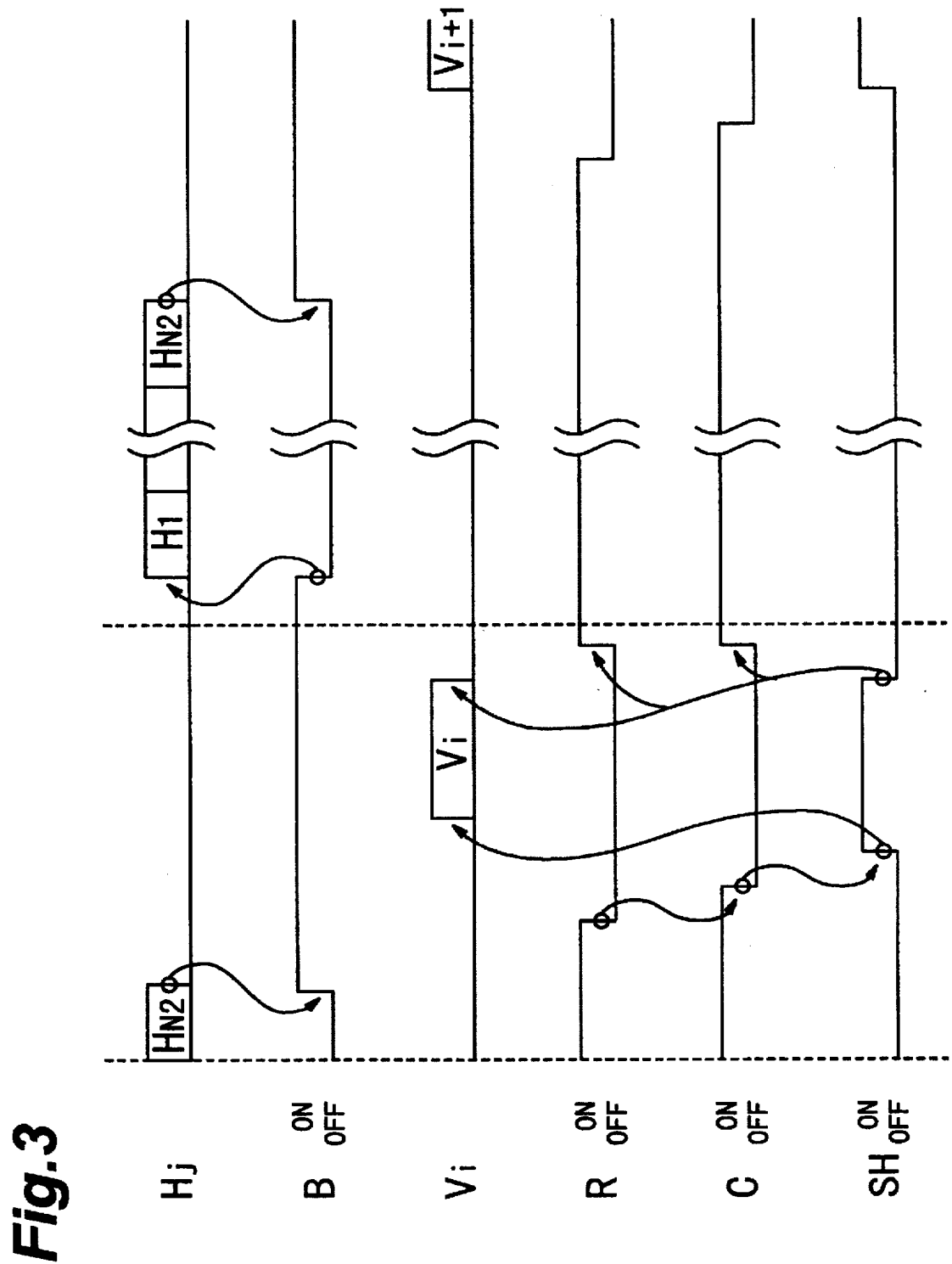
FIG. 3 is a timing chart for explaining an operation of the solid-state imaging apparatus of the embodiment of the present invention.

The solid-state imaging apparatus of this embodiment of the present invention collects the optical data input to the light receiving unit 100 in the following manner. FIG. 3 is a timing chart for explaining an operation of the imaging apparatus of this embodiment of the present invention.

In the solid-state imaging apparatus of this embodiment of the present invention, the timing control circuit 300 sets the horizontal scanning signal $H_j$ such that the output signal corresponding to any vertical light receiving section is not output from the horizontal reading-out section 270, that is, all switching elements 272 are rendered to be OFF state. The operation instruction signal B is rendered to be at logical one. The reset instruction signal R, the clamping instruction signal, and the sampling instruction signal SH are rendered to be logical one, that is, the switching elements 223, 240, and 161 are rendered to be ON state. At such situation, the vertical scanning signal $V_i$ is output from the vertical shift register 320, which renders only the switching element 140 of the light receiving device $110_{i,j}$, first selected in the vertical scanning, of each vertical light receiving section $110_j$. When the switching element 140 is rendered to be ON state, the charges which have been stored in the photoelectric conversion element 130 by light receiving is output from the light receiving unit 100 as the current signal. Then, the charges are instantaneously stored in the capacitance element 222 by the integration circuit 220 to be output as a voltage signal. Subsequently, the offset of the integration circuit 220 is reduced via the capacitance element 230. The signal is subjected to an impedance conversion by the buffer circuit 250. Thereafter, the charges with the quantity in accordance with that stored in the photoelectric conversion element 130 are stored in the sample-and-hold circuit 260. When the sampling time has passed, the sampling instruction signal SH is rendered to be logical zero. The sampling operation is finished. Immediately after completion of the sampling operation, the vertical scanning signal Vi is set such that the vertical scanning signal Vi does not say light receiving device $120_{i,j}$.

Next, the operation instruction signal B is set at logic zero. As a result, the integration circuit 220 and the buffer circuit 250 shift to the non-operation state. Power consumption by these becomes approximately zero. In spite that the integration circuit 220 and the buffer circuit 250 shifted to the non-operation state, the sample-and-hold circuit 260 has already been in the holding state. The sample-and-hold circuit 260 does not vary its output so that the output from the buffer circuit 271 does not vary.

Subsequently, the horizontal scanning signal $H_i$ is set such that the output from each buffer circuit 271 is sequentially read out alternatively whereby the detection signal in accordance with the charges stored in the light receiving device $120_{i,j}$, first selected in the vertical scanning, of each vertical light receiving section $110_j$.

It should be noted that after completion of the sampling operation, the reset instruction signal R and the clamping instruction signal C are set to be logical one until the horizontal scanning for the light receiving device $120_{i,j}$, first selected in the vertical scanning, of each light receiving section $110_j$ is finished.

When the sequential reading-out for the detection signal from the light receiving device $120_{i,j}$ is completed, the horizontal scanning signal $H_j$ is set such that the signal is not output from any vertical light receiving section. At the same time, the vertical scanning signal Vi is set such that any of the light receiving device $110_{i,j}$ is not selected. Thus, the vertical scanning signal is output, which renders only the switching element 140 to be ON state, the switching element 140 belonging to the light receiving device $120_{i,j}$ secondly selected in the vertical scanning, of each vertical light receiving section $110_j$. When the switching element 140 is rendered to be ON state, the charges, which have been stored in the photoelectric conversion element 130 by light receiving until rendering of the switching element 140 to ON state, are output from the light receiving device 100 as the current signal.

Afterward, similar to the case of the light receiving device $120_{i,j}$, the detection signal in accordance with the charges stored in the light receiving device $120_{i,j}$ is sequentially read out.

Subsequently, while designating the light receiving of each vertical light receiving section $110_3$, similar to the case of the light receiving device $120_{i,j}$, first selected in the vertical scanning, of each of the vertical light receiving section $110_j$, the detection signal in accordance with the charges stored in the light receiving device 120 of each vertical light receiving section $110_j$ is sequentially read out, whereby the imaging data of the optical image supplied to the light receiving unit 100 is collected.

Although the preferred embodiment of the present invention has been described in detail, it should be understood that various changes, substitutions and alternations can be made therein without departing from the spirit and scope of the inventions as defined by the appended claims. For example, in the above-described embodiment, the signal having the charge quantity in accordance with that stored in the photoelectric conversion element is collected. When the optical image supplied to the light receiving device for an actual time is picked up, the selection time for the light receiving device by the vertical scanning signal Vj may be set such that it overlaps at least with a time when the sampling instruction signal is at logical zero.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 136837/1995 filed on Jun. 2, 1995 is hereby incorporated by reference.

What is claimed is:

1. A solid-state imaging apparatus which images a two-dimensional optical image comprising:

a light receiving unit composed of a first number of vertical light receiving sections arranged along a first direction, each of which consists of a second number of light receiving devices arranged in a second direction, each light receiving device being composed of a photoelectric conversion element for converting an input optical signal to a current signal and a switching element which has a first terminal connected to a signal output terminal of said photoelectric conversion element and a second terminal to provide current signal generated by said photoelectric conversion element in response to a vertical scanning signal, each of said vertical light receiving sections having a signal output terminal electrically connected to the second terminal of said switching element;

a fist number of integration circuits for receiving individually the output signal from the corresponding vertical light receiving section, each of which enables, in response to a reset instruction signal, a first capacitance element either to perform an integration for the current signal output from the corresponding one of said vertical light receiving section or not to perform the integration for the current signal while said integration circuit is in operation in response to a first operation instruction signal, the first capacitance element being connected between input and output terminals of a charge amplifier and said integration circuit consuming no power substantially while said integration circuit is not in operation in response to the first operation instruction signal;

a first number of second capacitance elements, each receiving a first integration signal output from corresponding one of said integration circuits and outputting the first integration signal after reducing an offset value for corresponding one of said integration circuit;

a first number of clamping elements, each receiving a second integration signal via corresponding one of said second capacitance elements, and shortcircuitting a signal output terminal of corresponding one of said second capacitance elements to a ground terminal in response to a clamping instruction signal; a first number of first buffer circuits, each receiving said second integration signal from corresponding one of said second capacitance elements, and each outputting corresponding one of said second integration signals after performing an impedance conversion for corresponding one of said second integration signals during operating state in response to a second operation instructions signal and consuming no power substantially during non-operating state in response to the second operation instruction signal;

a first number of sample-and-hold circuits, each receiving a signal from corresponding one of said first buffer circuits, and performing either a sampling operation or a holding operation in response to a sampling instruction signal;

a first number of horizontal reading-out sections, each of which has a second buffer circuit and outputs and impedance conversion signal in response to a horizontal scanning signal, each second buffer circuit receiving a signal output from corresponding one of said sample-and-hold circuits and performing an impedance conversion for the signal; and a timing control section for issuing said vertical scanning signal, said clamping instruction signal, said reset instruction signal, said sampling instruction signal, and said horizontal scanning signal, rendering said first and second operation instruction signals to be truth at a state that any vertical light receiving section is not selected thereby reading out no signal from any vertical light receiving section prior to a start of a vertical scanning by said horizontal scanning signal and rendering said first and second operation instruction signals to be false during the vertical scanning by the horizontal scanning signal.

2. The solid-state imaging apparatus according to claim 1, wherein timings when said first and second operation instruction signals are rendered to be truth are approximately the same.

* * * * *